(12) United States Patent
Deutsch et al.

(10) Patent No.: US 10,761,928 B2
(45) Date of Patent: Sep. 1, 2020

(54) COMBINED SECURE MAC AND DEVICE CORRECTION USING ENCRYPTED PARITY WITH MULTI-KEY DOMAINS

(71) Applicant: Intel Corporation, Santa Clara, CA (US)

(72) Inventors: Sergej Deutsch, Hillsboro, OR (US); Wei Wu, Portland, OR (US); David M. Durham, Beaverton, OR (US); Karanvir Grewal, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/368,430

(22) Filed: Mar. 28, 2019

(65) Prior Publication Data

US 2019/0220349 A1    Jul. 18, 2019

(51) Int. Cl.
| | |
|---|---|
| *G06F 11/10* | (2006.01) |
| *H04L 9/32* | (2006.01) |
| *H04L 9/08* | (2006.01) |
| *G06F 21/00* | (2013.01) |

(52) U.S. Cl.
CPC ...... *G06F 11/1048* (2013.01); *G06F 11/1012* (2013.01); *G06F 11/1032* (2013.01); *G06F 11/1064* (2013.01); *G06F 21/00* (2013.01); *H04L 9/0894* (2013.01); *H04L 9/3242* (2013.01); *G06F 2211/007* (2013.01); *G06F 2211/104* (2013.01); *H04L 2209/34* (2013.01)

(58) Field of Classification Search
None
See application file for complete search history.

(56) References Cited

U.S. PATENT DOCUMENTS

| | | | |
|---|---|---|---|
| 10,180,875 B2 * | 1/2019 | Klein | G06F 11/1072 |
| 10,209,903 B2 * | 2/2019 | Grube | G06F 11/10 |
| 2019/0042369 A1 * | 2/2019 | Deutsch | G06F 3/0673 |
| 2019/0294499 A1 * | 9/2019 | Yang | G06F 11/1012 |

* cited by examiner

*Primary Examiner* — Phung M Chung
(74) *Attorney, Agent, or Firm* — Jaffery Watson Mendonsa & Hamilton LLP

(57) ABSTRACT

In one example a computer implemented method comprises generating an error correction code for a memory line, the memory line comprising a first plurality of data blocks, wherein the error correction code comprises a first plurality of parity bits and a second plurality of parity bits, applying a domain-specific function to the second plurality of parity bits to generate a modified block of parity bits, generating a metadata block corresponding to the memory line, wherein the metadata block comprises the error correction code for the memory line and at least a portion of the modified block of parity bits, encoding the first plurality of data blocks and the metadata block to generate a first encoded data set, and providing the encoded data set and the encoded metadata block for storage on a memory module. Other examples may be described.

21 Claims, 10 Drawing Sheets

US 10,761,928 B2

COMBINED SECURE MAC AND DEVICE CORRECTION USING ENCRYPTED PARITY WITH MULTI-KEY DOMAINS

BACKGROUND

Subject matter described herein relates generally to the field of electronic devices and more particularly to implementing security in computing environments.

Managing errors in data may include utilization of error correction techniques in conjunction with data storage and communication. Error correction may involve identifying and/or correcting errors that occur in data. In computer technology, error correction may be utilized to detect and correct data corruption, such as with error-correcting code (ECC) memory. Data corruption may refer to errors in computer data that occur during writing, reading, storage, transmission, or processing which introduce undesired changes to the original data. In the absence of error correcting techniques, data corruption may cause data loss and/or system failure.

Accordingly, techniques to implement computer security may find utility.

BRIEF DESCRIPTION OF THE DRAWINGS

The detailed description is described with reference to the accompanying figures.

DETAILED DESCRIPTION

Described herein are exemplary systems and methods to implement a combined secure message authentication code (MAC) and device correction using encrypted parity with multi-key domains. In the following description, numerous specific details are set forth to provide a thorough understanding of various examples. However, it will be understood by those skilled in the art that the various examples may be practiced without the specific details. In other instances, well-known methods, procedures, components, and circuits have not been illustrated or described in detail so as not to obscure the particular examples.

As used herein, the acronym MAC will be used to refer to a Message Authentication Code. The phrase data line and/or cache line will be used to refer to a line of data stored in the main memory.

Figure 1A:
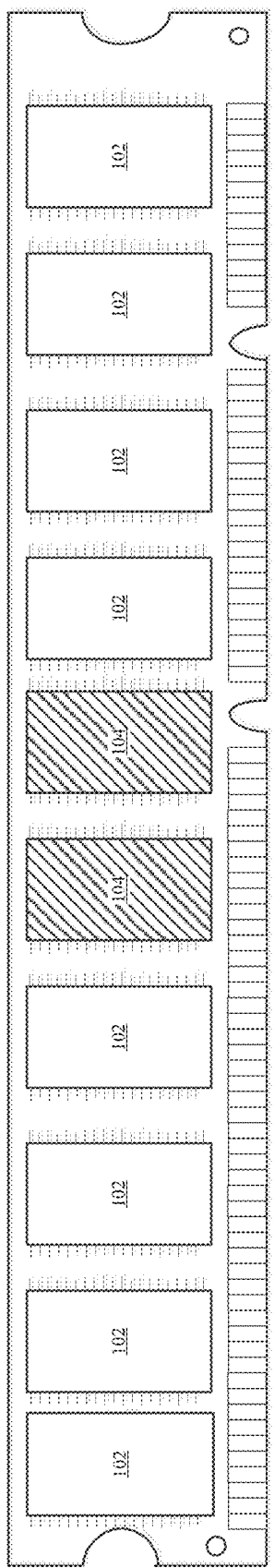
FIGS. 1A and 1B are schematic illustrations of memory modules in accordance with some embodiments.

Some challenges facing the management of data errors include the inability to provide error detection, location, correction, and cryptographic data integrity without excessive memory overhead. These challenges may result from an ECC memory requiring two or more management memory devices to enable error corrections for a set of storage memory devices. For example, a first management memory device may be used to locate bit errors and a second management memory device may be used to store parity bits to correct bit errors. Where each memory device is a memory chip, such a scheme may include two memory chips in addition to the memory chips that store the target data in order to support error correction. For instance, referring to FIG. 1A, a memory module 100 according to the fifth generation of double data rate synchronous dynamic random-access memory (DDR5) may utilize eight storage memory devices on a direct in-line memory module (DIMM) to store memory lines and two management memory devices 104 for ECC, where a first memory management device may store parity data and a second memory management device may store error locators (e.g., using a Reed-Solomon code) and additional metadata bits.

In some schemes, ECC memory may also lack security. In such schemes, a malicious user may be able to reverse the ECC algorithm and flip bits that could allow modified or corrupted data to pass undetected. In other embodiments, securing ECC memory cryptographically may utilize additional memory, such as to store indications of message authentication codes (MACs). For example, DDR5 (and post-DDR5) memory will provide cryptographic protection for data. Memory confidentiality and integrity will be provided using key domain separation, i.e., encrypting different ranges of memory with separate keys to provide cryptographic isolation between key domains. Such techniques can be used for virtual machine (VM) isolation and fine-grain isolation to detect SW bugs and vulnerabilities (i.e., memory tagging to detect buffer overflow/underflow, use-after-free bugs).

In some examples, subject matter described herein addresses these and other issues by reducing the dependency of error correction and multiple-key encryption. This dependency affects memory patrol scrubbing, a process in which memory is periodically read and corrected, preventing error accumulation and hence data become uncorrectable. Patrol scrubbing is an important reliability, accessibility, and serviceability (RAS) feature offered by server products. Since the data is cryptographically bound to a domain key and the patrol scrubber has no domain knowledge (i.e., what key to use), the patrol scrubber cannot decrypt encrypted parity to perform error detection and correction. Subject matter described herein provides a solution to these and other problems by adding new features to ECC algorithms.

Figure 1B:
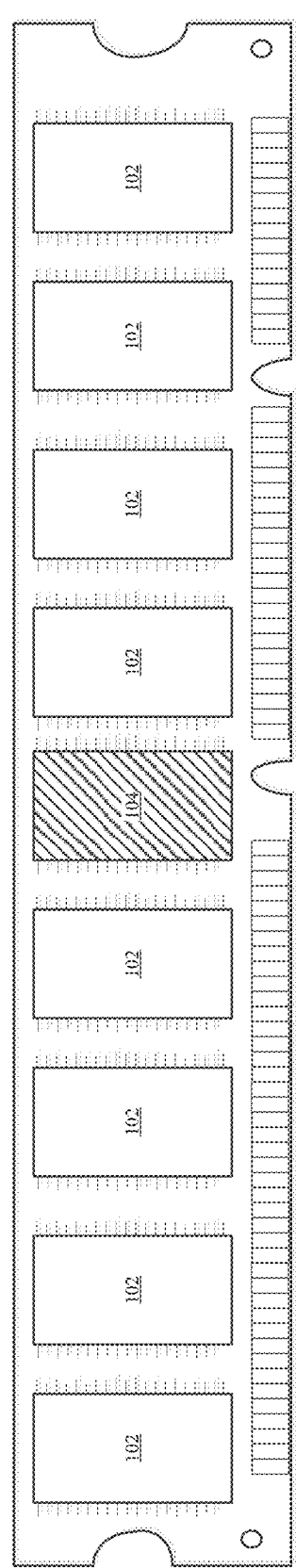

Referring to FIG. 1B, various embodiments described herein include a data error manager that can provide error detection, location, and correction and metadata storage for a memory module 100 (e.g., a DIMM) having eight (8) DDR5 memory devices 102 with a single management memory device 104. In various embodiments, cryptographically secure memory encryption and/or integrity may additionally, or alternatively, be provided for the set of storage memory devices 102 with the single management device 104. In some embodiments, ECC and metadata may be combined with a cryptographically strong message authentication code (MAC) that cannot be circumvented by either random errors or adversarial attacks on physical memory (e.g., via a logic probe, field programmable gate array (FPGA), man-in-the-middle attack on the memory bus, processor to processor interconnect, or other attack). Thus, various embodiments may enable one or more of quick and efficient error corrections, memory protections, improved memory efficiency, improved memory performance, reduced memory hardware, and reduced memory bandwidth utilization, resulting in one or more technical effects and advantages. As an example, ECC memory can be offered at a lower cost without sacrificing security via memory encryption with cryptographic integrity.

Subject matter described herein allows for ECC in DDR memory using only a single memory device, while also enabling patrol scrubbing. In some examples a single device error correction code is combined with a cryptographically strong MAC that cannot be circumvented by either random errors or adversarial attack on physical memory. Further, subject matter described herein enables patrol scrubbing in systems with domain-specific keys for integrity protection. As described above, ECC memory and MACs for cryptographically secure memory add overhead (additional memory, bandwidth, etc.). Conventional ECC requires two extra devices (chips) per DIMM to locate and then correct errors (up to a failing device). Cryptographically secure memory integrity also requires extra space to store the MACs and associated bandwidth overhead for reading/writing the MACs. Subject matter described herein allows the two ECC devices (for error detection, location and correction) into one device, while still detecting and correcting device failures, and furthermore, making this combined value a cryptographically secure MAC, thus, providing cryptographic memory integrity. In addition, subject matter described herein enables domain-independent patrol scrubbing.

Figure 2:
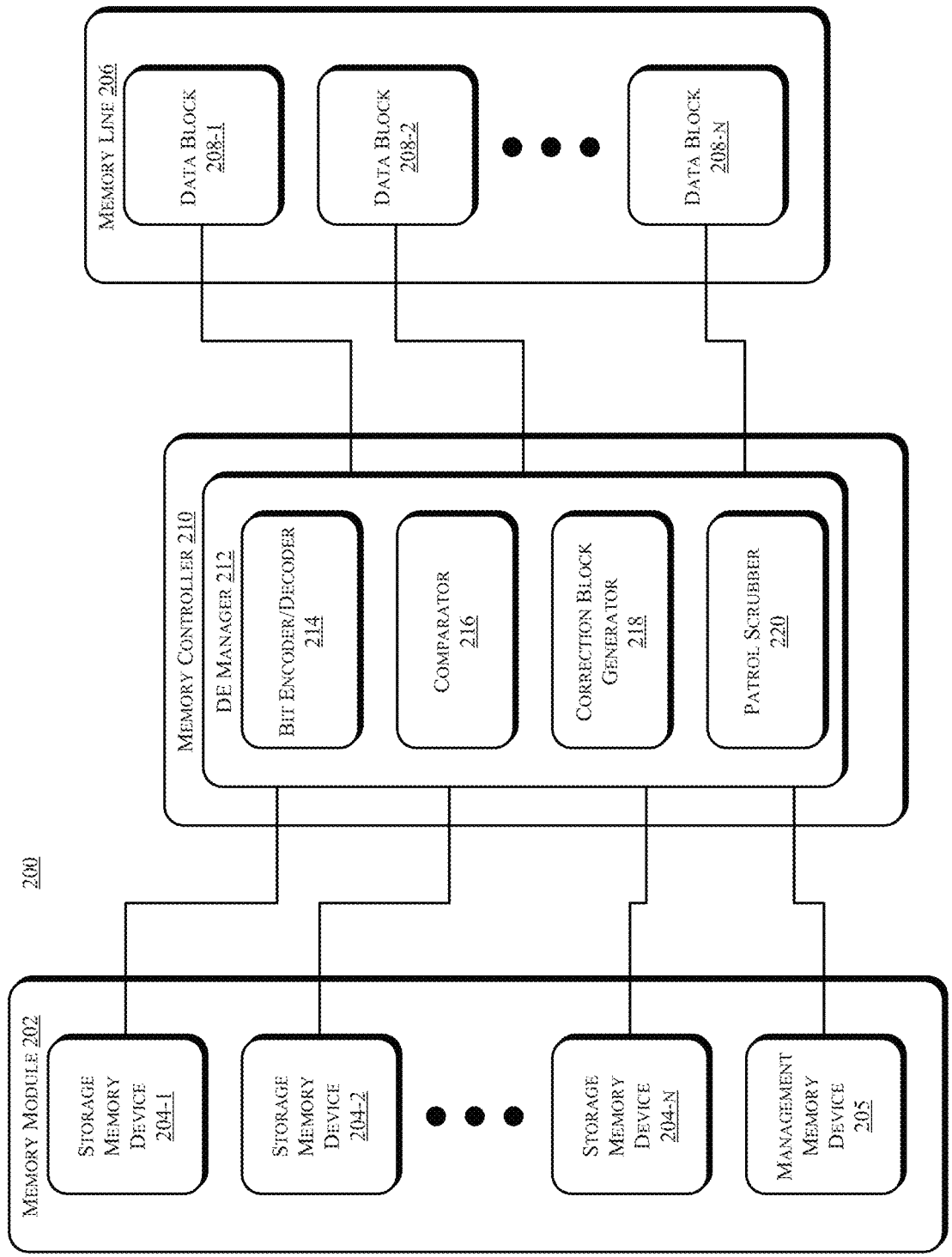
FIG. 2 is a schematic illustration of a memory system in accordance with some embodiments.

FIG. 2 illustrates a system 200 for identifying and correcting data errors in accordance with certain embodiments. System 200 may include a memory module 202 with storage memory devices 204-2, 204-2, . . . 204-N (referred to herein as storage memory devices 204) and management memory device 205, memory controller 210 with data error (DE) manager 212, and memory line 206 with data blocks 208-1, 208-2, . . . 108-N (referred to herein as data blocks 208), where N is any suitable integer. In various embodiments, memory module 202 may include multiple management memory devices 205. In one or more embodiments, DE manager 212 may provide error correction for data stored in memory module 202, such as by generating and storing error correction data in management memory device 205. In one or more such embodiments, error correction data may enable one or more of detection, location, and correction of errors in memory module 202. In many embodiments, DE manager 212 may also, or alternatively, provide cryptographically secure memory encryption and integrity for data stored in memory module 202. In various embodiments described herein, DE manager 212 may provide, via a single management memory device (e.g., management memory device 205), one or more of error detection, location, correction, encryption, and integrity for data stored in multiple storage memory devices 204 of memory module 202. In some embodiments, DE manager 212 may be able to detect, locate, and correct multiple errors occurring in a data block or metadata block in a storage memory device 204 or a management memory device 205.

Memory line 206 may represent data to be stored in memory module 202. In some examples memory line 206 can be encrypted (through some other encryption engine up-stream not shown in FIG. 2) or in plaintext. In various examples, memory line 206 may include a cache line that has been evicted from a processor cache (e.g., of a host device) that is to be stored in memory module 202 or a cache line that is to be loaded/retrieved from a memory (e.g., memory module 202) and placed into the processor cache. In some embodiments, data blocks 208-1, 208-2, . . . 208-N may each represent a distinct portion of the memory line 206, such as a memory row. In various embodiments, data representing each of data blocks 208 may be stored in corresponding storage memory devices 204-1, 204-2, . . . 204-n. For example, data representing data block 208-1 may be stored in storage memory device 204-1, data representing data block 208-2 may be stored in storage memory device 204-2, and so on. In one example, DE manager 212 may perform a bit encoding operation on data block 208-1 and store the result in storage memory device 204-1, then (or contemporaneously) perform a bit encoding operation on data block 208-2 and store the result in storage memory device 204-2, and so on for each data block of memory line 206. Thus, in some embodiments, the number of data blocks 208 of a memory line 206 may equal the number of storage memory devices 204 in memory module 202.

In some embodiments, DE manager 212 may store metadata associated with memory lines in management memory device 205 to enable one or more of error detection, location, correction, encryption, and integrity for data stored in memory module 202. In many such embodiments, at least a portion of the data stored in management memory device 205 is generated based on data of memory line 206. In some embodiments, metadata blocks associated with memory lines are stored based on the storage location of data blocks representing the memory lines. For example, if data blocks representing a particular memory line are stored in respective first physical rows of storage memory devices 204, a corresponding metadata block is stored in the first physical row of management memory device 205; if data blocks representing another memory line are stored in respective second physical rows of storage memory devices 204, a corresponding metadata block is stored in the second physical row of management memory device 205, and so on. Other embodiments may include different storage schemas.

In various embodiments, memory module 202 may comprise computer memory that includes a plurality of memory chips that can be represented by storage memory devices 204 and management memory device 205. For example, management memory device 205 may be a first memory chip, storage memory device 204-1 may be a second memory chip, storage memory device 204-2 may be a third memory chip, and so on. In one example, memory module 202 may include a DIMM with a set of memory chips. In some embodiments, multiple memory modules 202 (e.g., DIMMs) may be included in a computer system. In some such embodiments, the collection of memory modules 202 in a computer may be referred to as or included within the external memory of the computer (e.g., random access memory (RAM)).

In various embodiments, storage memory devices 204 and management memory device 205 of memory module 202 may include one or more of ECC memory, DDR memory, hard drive storage, redundant array of independent disks (RAID) storage, flash memory, nonvolatile memory, 3D crosspoint memory, and the like. In some embodiments, each storage memory device 204 and management memory device 205 in memory module 202 may be the same or similar. For example, each device may comprise the same amount(s) of the same type(s) of memory. As another example, each device may comprise the same form factor (e.g., physical dimensions, electrical connector pinout, etc.) In such embodiments, distinctions between storage memory devices 204 and management memory device 205 may reside in the purpose they are used for. Therefore, in some such embodiments, whether a memory device is used as a management memory device 205 or a storage memory device 204 may be arbitrary and/or selectable.

From a redundancy perspective, the distinctions between the memory devices 204 may be physical boundaries that represent the probable extent of a physical failure. For instance, one physical chip or its associated wiring may fail, while the other physical chips or their associated wiring may remain operational. In other embodiments, the physical boundaries may be defined within the physical device, such as a physical row, column, bank, or other adjacency of memory circuits. For example, in a RAID system, each storage memory device 204 may be a distinct hard drive and management memory device 205 may be a separate hard drive used to correct one or more failing hard drives.

Memory controller 210 may include DE manager 212 as well as other circuitry (e.g., circuitry for communicating with memory module 202). DE manager 212 may include bit encoder/decoder 214, comparator 216, and metadata block (MB) generator 218, and any other suitable circuitry. In some embodiments, DE manager 212 may implement ECC, such as via one or more of bit encoder/decoder 214, comparator 216, and MB generator 218. In one or more embodiments, DE manager 212 may utilize bit encoder/decoder 214, comparator 216, and/or MB generator 218 to provide error correction for data stored in memory module 202. DE manager 212 may utilize management memory device 205 to store data used to enable the error detection, error correction, confidentiality, and/or integrity. For example, data generated by one or more of bit encoder/decoder 214, comparator 216, and MB generator 218 may be stored in management memory device 205. For example, data such as correction blocks, may be generated and stored in management memory device 205 to facilitate detection of and/or correction of data errors present in data stored in one or more storage memory devices 204.

In various embodiments, the DE manager 212 is able to provide error detection, location, correction, confidentiality, and/or integrity for the storage memory devices 204, at least in part by performing various logical operations on data blocks 208 utilizing components of DE manager 212, such as bit encoder/decoder 214, comparator 216, and MB generator 218. In various embodiments, DE manager 212 may implement one or more of these features for data to be stored by a group of storage memory devices 204 via a single management memory device (e.g., management memory device 205). In various embodiments, using a single management memory device 205 to implement one or more of the features described herein may reduce the resources required to implement the one or more features described herein. In some embodiments, DE manager 212 may combine ECC with a cryptographically strong MAC that prevents circumvention by either random errors or adversarial attack on physical memory (e.g., memory chips), or on the bus from memory controller to a DIMM. In one or more embodiments, DE manager 212 may store the combined ECC and MAC in management memory device 205. In some embodiments, MACs may be used for one or more of memory integrity, providing a variety of usages including data corruption detection, memory access control, virtual machine isolation, or other purposes.

In one or more embodiments, bit encoder/decoder 214 may be used to randomize/derandomize bits in a data block 208 prior to the bits being stored in memory module 202. For example, data block 208-1 may be randomized to generate an encoded block that is stored in storage memory device 204-1. In some embodiments, data transformations by bit encoder/decoder 214 may result in bit diffusion (permutation and distribution) such that a one-bit change in the input will on average flip 50% of the bits in the output. In various embodiments, bit encoder/decoder 214 may provide two-way operation such that any data transformations performed by bit encoder/decoder 214 may be reversible, such as through cryptography. For instance, data blocks 208 may be recovered from encoded data blocks stored in memory module 202. Some embodiments may include separate bit encoder and bit decoder components. In various embodiments, encoding and decoding may be inverse operations. In some embodiments, encoding and decoding may be symmetric operations. Exemplary memory read and write flows will be described in more detail below in connection with FIG. 2 and FIG. 3.

In some embodiments, bit encoder/decoder 214 may utilize a cryptographic algorithm, such as a block cipher. In various embodiments, one or more keys may be used by bit encoder/decoder 214 to encrypt/decrypt data, such as in conjunction with a block cipher. For example, bit encoder/decoder 214 may utilize a key to encrypt a data block 208 or a metadata block prior to storage in a storage memory device 204 or management memory device 205 respectively and to decrypt data retrieved from a storage memory device 204 or management memory device 205 to recover a data block 208 of memory line 206 or metadata block. Some embodiments may include separate encryption and decryption components within bit encoder/decoder 214. In various embodiments, the encryption and decryption operations performed by bit encoder/decoder 214 may be inverse operations. In some embodiments, the encryption and decryption operations may be symmetric operations.

In one embodiment, the block cipher input and output blocks are the same size. In many embodiments, the block cipher input block may match the bit size of a data block 208 of memory line 206 and/or the bit size of a metadata block associated with memory line 206. In one or more embodiments, the block cipher output may match a bit size of a storage memory device or management memory device. In an example, the block cipher output matches a memory device size for a row of a stored memory line. In various embodiments disclosed herein, plaintext may be used to refer to one or more of decoded, nonencrypted, de-diffused, and/or decrypted data blocks or correction blocks while ciphertext may be used to refer to one or more of encoded, diffused, and/or encrypted data blocks or correction blocks.

In many embodiments, comparator 216 may be used to verify whether data has become corrupted, e.g., during a memory read. For instance, comparator 216 may compare values, such as error correction codes generated by MB generator 218 to corresponding data blocks to ensure data has not changed. In various embodiments, comparator 216 may perform one or more entropy tests on read data to identify errors in read data. Comparator may also provide information associated with error identification.

In many embodiments, MB generator 218 may be used to generate values (e.g., error correction codes) that enable error detection and correction for memory module 202. In some embodiments, the error correction codes include or are based on parity bits. In various embodiments, MB generator 218 may provide two-way operation such that any data transformations performed by MB generator 218 may be reversible. In one or more embodiments, MB generator 218 may generate an error correction code by performing logical operations on portions of memory line 206. For instance, an error correction code may be generated by bitwise XORing content from each of data blocks 208 together. XOR operators or operations may be advantageously used to generate error correction codes because XOR operations are order independent (commutative and associative) and there is no overflow/carry (i.e., input and output are the same size). Also, an XOR operation may be the same as an addition operation on integers modulo 2. However, additional or alternative data transformation may be used by MB generator 218 to generate an error correction code. For example, in some embodiments the MB generator 218 may perform addition, subtraction, multiplication, division, or other operations (e.g., to data blocks 208), but such operations may cause overflow/underflow and/or carry values. In other examples the operations may include operations in Galois fields that work without overflow/underflow or carry values. Thus, such operations may only be suitable for some data (e.g., small numbers) unless the overflow/underflow and carry values are accounted for. In another example, additional transformations may be performed along with an XOR operation, such as additional bit permutations or even full diffusion with encryption. In a further example, lossless compression may be used to generate error correction codes. In other examples, Hamming codes, code book substitutions, or similar techniques may be used to generate error correction codes.

In various embodiments, DE manager 212 may store a respective metadata block containing an error correction code in management memory device 205 for each memory line 206 stored in the set of storage memory devices 204. In one or more embodiments, bit encoder/decoder 214 may encode and/or encrypt the metadata blocks prior to storing them in management memory device 205. In various embodiments described herein, the error correction codes of the metadata blocks may be used to correct bit errors in a memory line read from memory module 202. Exemplary error correction flows will be described in more detail below in connection with FIGS. 3A-3D.

Error Detection

Figure 3A:
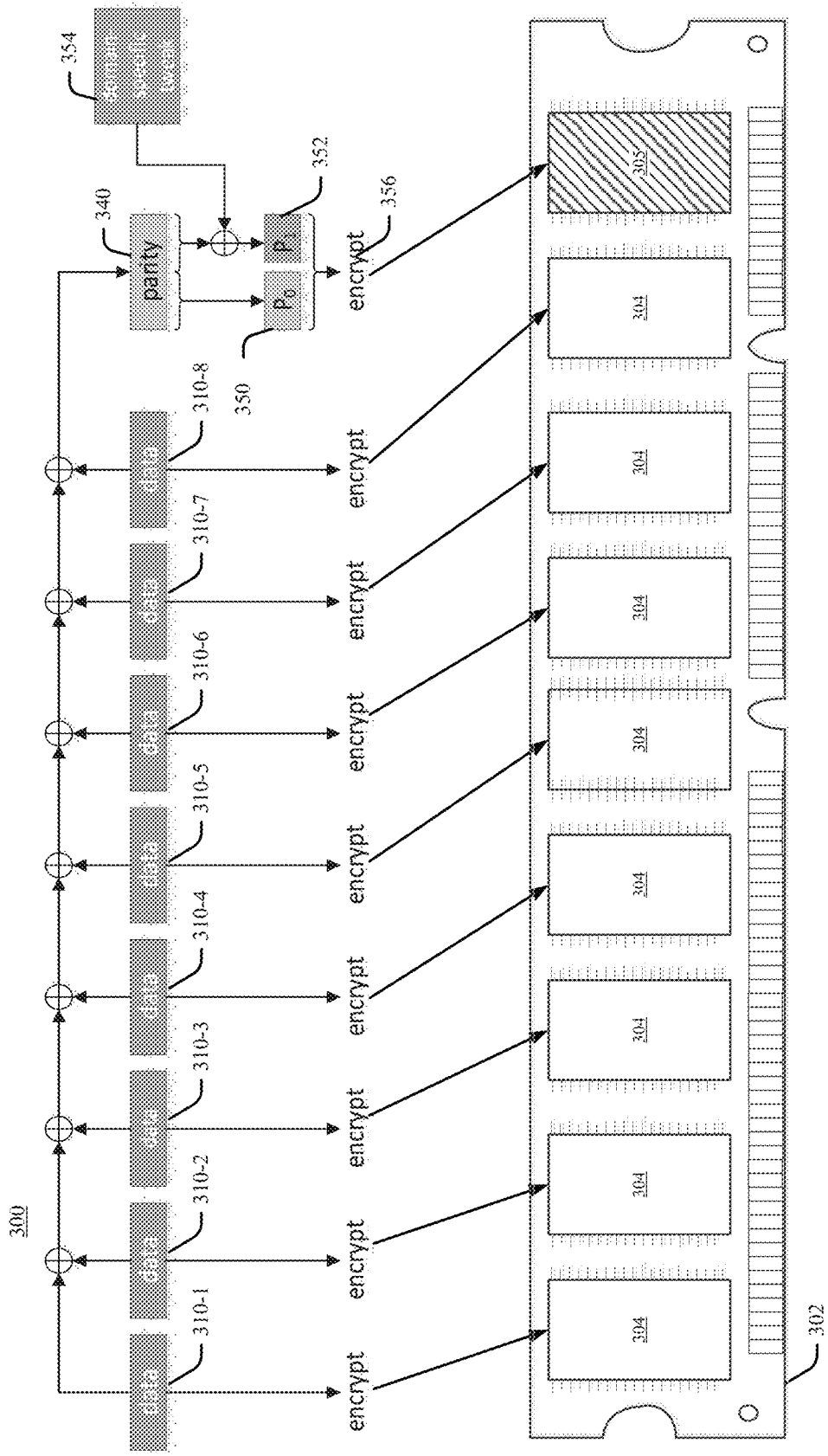
FIGS. 3A, 3B, 3C and 3D are schematic illustrations of memory operations in accordance with some embodiments.

FIG. 3A illustrates a flow for generating a metadata block and storing an encrypted metadata block and encrypted data blocks in accordance with certain embodiments. The generation of the metadata block and storage of the encrypted metadata block and encrypted data blocks may occur during a write flow of a memory line (e.g., 206) to a memory module 302. In various embodiments, one or more components illustrated in FIG. 3A may be the same or similar to one or more components in FIG. 2. For instance, memory module 302 may have any one or more characteristics of memory module 202, management memory device 305 may have any one or more characteristics of management memory device 205, the data blocks 310 (i.e., 310-1, 310-2, etc.) may have any one or more characteristics of data blocks 208, and the metadata block 340 may have any one or more characteristics of a metadata block described in connection with FIG. 3.

In various embodiments, the flow depicted in FIG. 3A may be performed by memory controller 210 (e.g. utilizing DE manager 212), memory controller 210 in conjunction with circuitry coupled to memory controller 210, and/or other suitable circuitry. In one or more embodiments described herein, metadata block 340 may be generated based on each of data blocks 310 (e.g., of a memory line). In one or more such embodiments, metadata block 340 may facilitate one or more of error detection, location, correction, encryption, and integrity for data stored in memory module 302. Embodiments are not limited in this context.

In many embodiments, the data blocks 310 collectively constitute a memory line, such as an evicted cache line that is to be stored in memory external to a host, such as memory module 302. For instance, the memory line may be evicted from a processor cache of the host. In one example, the memory line may include 64 bytes while each of data blocks 310 include 64 bits. In other embodiments, the memory line and each of data blocks 310 may be any other suitable size (e.g., 64 bytes and 128 bits respectively). In various embodiments, each of data blocks 310 may represent a row of the memory line. In some embodiments, data blocks 310 may collectively include the content of the memory line. In one or more embodiments, each of data blocks 310 may be the same size. In a particular embodiment, metadata block 340 is the same size as each of data blocks 310.

In some embodiments, during a write operation to memory module 302, at least a portion of the bits of each of data blocks 310 may be XORed together to generate XORed plaintext of an error correction code of the metadata block 340. In various embodiments, a reduced-length parity value is calculated over only a portion of the bits of data blocks 310 to generate error correction code, while a remaining portion of the bits are not involved in the parity calculation. As an example, if each of the data blocks 310 is X bits wide, the metadata block 340 is X bits wide, and S metadata bit(s) are stored in the metadata block 240; then the parity may be calculated (e.g., by performing an XOR operation) over X-S bits of each data block 310 (e.g., the most significant X-S bits, the least significant X-S bits, or any other suitable X-S bits of each data block) to generate an X-S bit error correction code. The bits of the data blocks used to generate the error correction code may, but are not required to, be in the same position within each data block 310. For example, if metadata bit(s) includes 1 metadata bit and the data blocks 310 and metadata block 340 are each 64 bits wide, a 63-bit parity value for the error correction code may be calculated by XORing 63 bits of each of the data blocks 310. If the metadata bit(s) include 2 metadata bits, then the parity value for the error correction code may be calculated by XORing 62 bits of each of the data blocks 310; and so on. In some embodiments, S may be any reasonably low integer (e.g., 1-4 bits), although S may alternatively be a higher integer in other embodiments. In some embodiments, the number of metadata bits (S) per metadata block 340 may be user configurable to allow flexibility based on the application.

Although the flow in FIG. 3A depicts a partial length parity calculation (e.g., that may be performed for all or some of the memory lines stored in memory module 302), in other embodiments full length parity calculations may be used and the metadata bits for various memory lines stored in memory module 302 may instead be stored on an additional management memory device 205. Alternatively, the metadata bits may be interspersed with the error correction code across two or more management memory devices 205. Such embodiments may still benefit from various techniques (e.g., error detection and correction techniques) described herein despite not benefiting from the reduced footprint that a single management memory device 205 provides.

Any suitable data may be stored in the metadata bit(s) of metadata blocks 340. The metadata bit(s) may be data distinguished from the error correction code (e.g., metadata bit(s) are not parity bits, or at least are not parity bits from the same calculation used to generate error correction code). In some embodiments, metadata bit(s) of a metadata block 340 comprise metadata for the memory line corresponding to the metadata block 340.

Metadata bit(s) may include any suitable metadata. As one example, metadata bit(s) may comprise one or more locator bits for identifying a bad memory device (e.g., a memory device in which one or more errors have occurred)

from among the memory devices 304 and 305 (e.g. using a Reed-Solomon code), a poison bit for the memory line corresponding to the particular metadata block 340 (e.g., the poison bit may be set if an error is detected in the memory line and the error is uncorrectable by the memory controller 210), one or more directory bits (for use in cache coherency schemes to identify a location, e.g., a different semiconductor package, in which the memory line is cached), one or more encryption bits specifying whether and/or how the memory line is encrypted, one or more key identifier bits specifying a key used for encrypting the memory line, one or more wear leveling bits associated with an address of the memory line, or other suitable metadata. Some systems may utilize cryptographic MACs for memory integrity (e.g. KMAC, GMAC, or HMAC), which enable a variety of usages including data corruption detection, memory access control, virtual machine (VM) isolation, and others. Such systems utilizing MACs may utilize separate metadata stored for each memory line in the metadata bit(s) of the correction block corresponding to the memory line.

The metadata of metadata bit(s) may be consumed by the memory module 302 or by one or more components of a host computing system that utilizes the memory module 302 to store data (e.g., the memory controller 210 or a processor core).

In some examples, bit encoding operations may include encryption operations. In one or more embodiments, data blocks 310 may be encrypted (e.g., via bit encoder/decoder 314 with a block cipher which may have a block size the same as the size of each of data blocks 310. The encrypted data blocks may be stored in respective storage memory devices 304. For example, encrypted data block 310-1 may be stored in storage memory device 304-1, encrypted data block 310-2 may be stored in storage memory device 304-2, encrypted data block 310-3 may be stored in storage memory device 204-3, and so on through encrypted data block 310-8 being stored in storage memory device 304-8. In various embodiments, metadata block 340 (including the metadata bit(s) and the error correction code) may be encrypted (e.g., via bit encoder/decoder 314 with a block cipher) and stored in management memory device 305. In other embodiments, metadata block 340 and/or data blocks 310 may be diffused instead of (or in addition to) encrypted. In some embodiments, one or more of error detection, location and/or correction may be provided for data stored in memory module 302, however, security and/or integrity may not be guaranteed for data stored in memory module 302 (e.g., the data blocks 310 and/or metadata block 340 may be written to memory devices 304 and/or 305 in an unencrypted state). In various embodiments, data may be written or stored to memory module 202 through memory controller 210.

As previously mentioned, in many embodiments, the block cipher input block may match the bit size of a data block of the memory line 306. For instance, Simon, Speck64, Prince, Data Encryption Standard (DES), or Triple DES (3DES) may represent ciphers that match the 64-bit data block size for DDR5 memory. In another instance, Simon32 or Speck32 may represent ciphers that match the 32-bit block size for DDR4 memory devices. In yet another instance, advanced encryption standard (AES) may be used, such as in conjunction with storage memory devices with a device density of 128 bits per transaction. In other embodiments, other ciphers for any suitable block size may be used. In embodiments in which security is not critical, or security is not as important as performance, reduced round block ciphers may be used (e.g., 2 rounds of AES instead of the recommended 10 rounds, etc.). In one or more embodiments, the block cipher output may match a bit size (e.g., number of bits) of a memory device (e.g., a storage memory device 304 and/or management memory device 305). For instance, the block cipher output size may match the size of a row of a memory device 304 or 305. Thus, the block cipher output size may correspond to the bits of a memory line stored by a single memory device (e.g., 304).

In various embodiments, encryption may be performed using a secret key. In some embodiments, encryption may be performed in accordance with multi-key total memory encryption (MKTME). In some such embodiments, the key to use in encryption operations may be determined, (e.g., by memory controller 210, DE manager 212, or other circuitry) based on address bits (e.g., one or more address bits of a logical or physical address of the particular memory line being encrypted) or other metadata that indicates which key to use. In some instances, usage of an incorrect key to decrypt data and verify the associated integrity may result in an integrity violation and/or uncorrectable error. In various embodiments, the use of a wrong key may be detected in addition to or in place of detecting bit errors. Furthermore, in one or more embodiments, xor-encrypt-xor based tweaked-codebook mode with ciphertext stealing (XTS) mode, or other tweakable modes such as Liskov, Rivest, and Wagner (LRW), may be used to encrypt a data block 310. In one or more embodiments, XTS mode may be used and the physical memory address of each data block 310 is used as an additional tweak so that all ciphertext data blocks will look different for different addresses.

In some examples the DE manager 212 may comprise a patrol scrubber 220 capable to implement an error-detection mechanism as described herein that does not require domain knowledge. This may be achieved by using a technique referred to herein as "split-parity" as illustrated is shown in the FIGS. 3A-3D. Referring to FIG. 3A, during a write operation in split-parity mode, one part of the parity component of metadata 340 is left unmodified as component $P_0$ 350. The remaining part 352 is modified, e.g., by XORing the corresponding portion of the parity component of metadata 340 with a domain-specific tweak 354. In some examples the tweak 354 is derived from the domain key, for instance, by encrypting the memory physical address of the memory with the domain key and truncating it to a desired length. The result, $P_1$ 352 is concatenated with the unmodified parity bits $P_0$. The concatenation is then encrypted 356 using a domain-independent static key stored in a hardware register in the memory controller 210. Separately, the data is also encrypted using the domain-independent key. Note that this technique is not limited to a specific block size and a specific number of blocks.

Figure 3B:
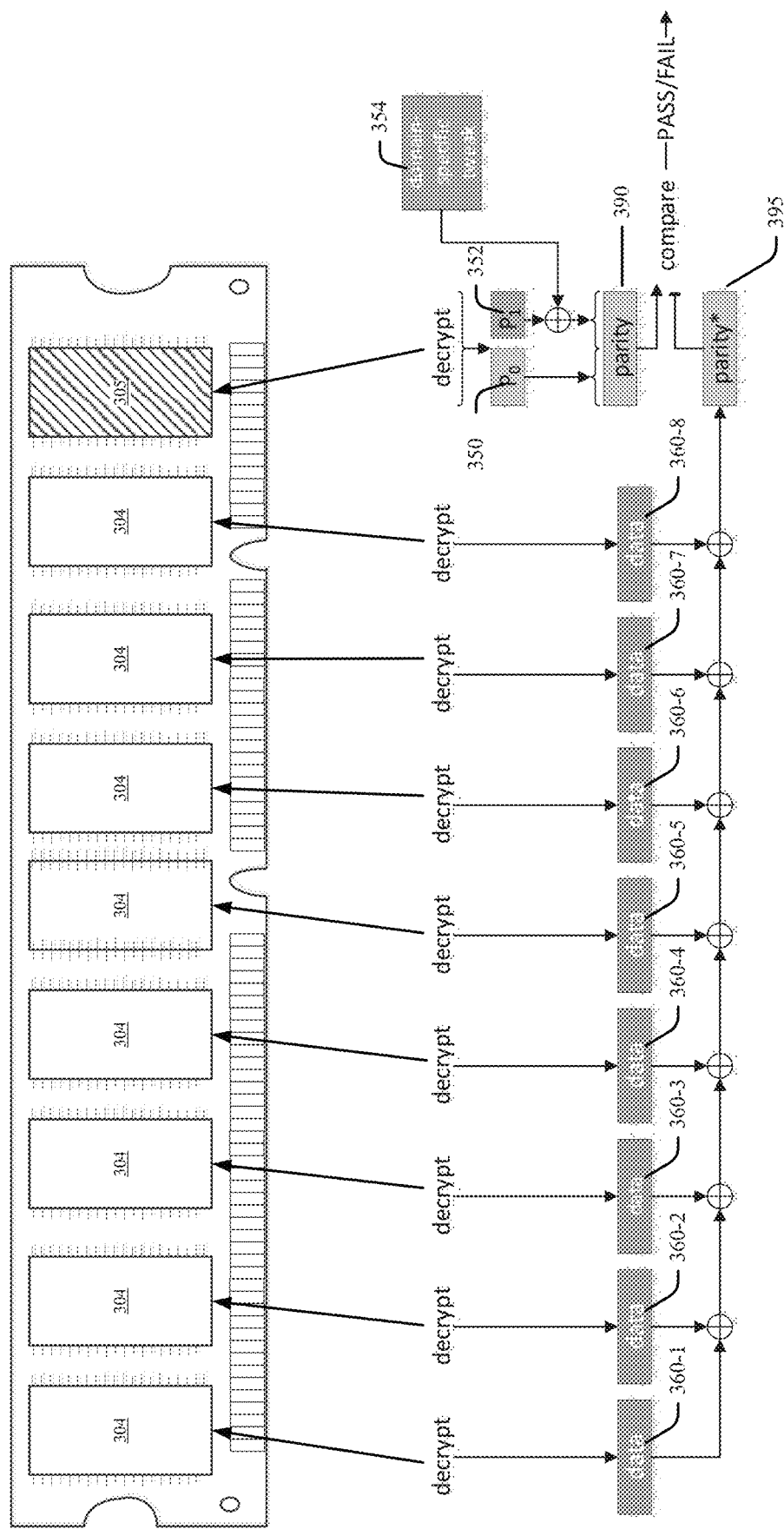
Figure 3C:
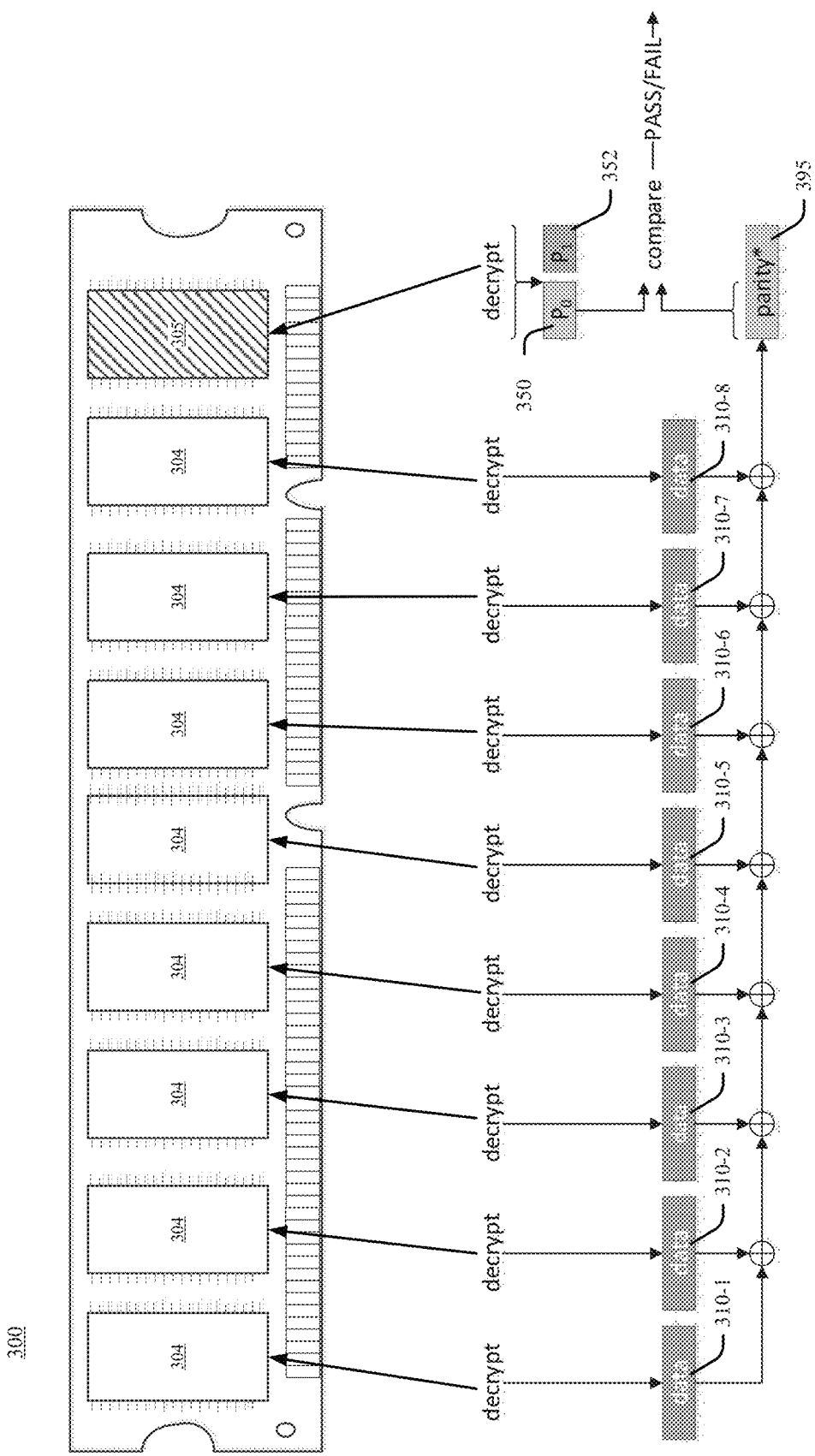
Figure 3D:
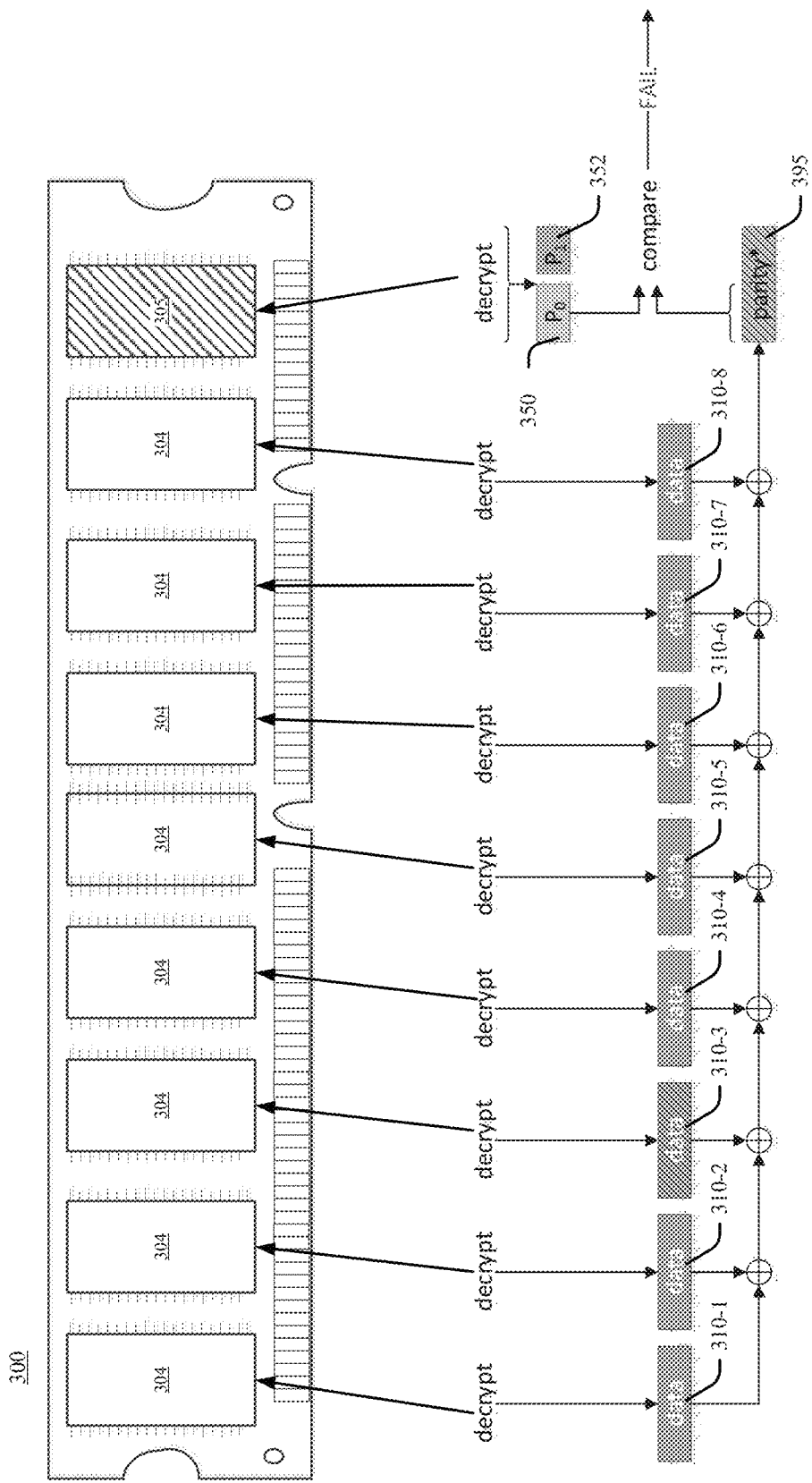

FIGS. 3B-3D illustrate flows for identifying a data error in accordance with certain embodiments. The flow of FIGS. 3B-3D may be representative of a read flow from memory module 302. In various embodiments, one or more components illustrated in FIGS. 3B-3D may be the same or like one or more components in FIG. 2 or FIG. 3A. For instance, data blocks 360 (i.e., 360-1, 360-2, etc.) may have any one or more characteristics of data blocks 208 or data blocks 310, and the metadata block 390 may have any one or more characteristics of the metadata block 340 of FIG. 3A. In various embodiments, the flow of FIGS. 3B-3D may be performed by memory controller 210 (e.g. utilizing DE manager 212), memory controller 210 in conjunction with circuitry coupled to memory controller 210, and/or other suitable circuitry.

In one or more embodiments, data associated with a memory line (e.g., the data stored in memory module 302 as part of the flow of FIG. 3A) may be read from memory module 302 and decrypted. For example, data may be read from management memory device 305 and decrypted to generate metadata block 390 and data may be read from storage memory devices 304-1 through 304-8 and decrypted to generate data blocks 360-1 through 360-8 (which may be in plaintext format). In an embodiment, at least a portion of each decrypted data block 360 may be used to generate a validation block 395 that is compared to at least a parity portion of the metadata block 390 to verify integrity and/or correctness of the data. Embodiments are not limited in this context.

In some embodiments, data portions of each of decrypted data blocks 360 are XORed together to generate XORed plaintext to form validation block 395. The portions of the decrypted data blocks 360 that are XORed may be the same portions that were XORed to form the error correction code when the data blocks were written to memory module 302. In some embodiments, the error correction code portion of metadata block 290 and the validation block 295 may be compared to determine if they are equal. For instance, the error correction code portion of metadata block 290 and the validation block 295 may be compared by comparator 216. If the error correction code portion of metadata block 390 and the validation block 395 are equal, it may be determined that no bit error or data corruption has occurred for the memory line. However, if the error correction code portion of metadata block 390 and the validation block 395 are not equal, it may be determined that one or more bit errors or data corruption have occurred. In various embodiments, when a bit error or data corruption is detected, an error correction flow may be entered.

On regular reads requested by the CPU complex, the memory controller 210 processes the data as shown in FIG. 3B. First, data and parity are decrypted. In order to restore the original parity, the domain-dependent portion of parity $P_1$ is XORed with the domain specific tweak 316. The resulting parity 390 is then used to verify the integrity of data and perform error correction, as described above.

In some examples the patrol scrubber works outside of regular reads requested by the CPU. This can be considered as a 'background task', which is responsible for periodic scanning of memory and detecting any errors. Since the patrol scrubber does not have domain information to fully recover the parity, it compares the partial parity P0 310 with the corresponding section of the parity 322 to perform error detection as shown in FIG. 3C.

Due to the diffusion property of decryption, even a single bit error in a device will result in randomizing the entire decrypted data block, and hence also diffuse the parity, as shown in FIG. 3D. The probability of resulting partial parity matching P0 is relatively low. For instance, if size of P0 is 32 bits, this probability is approximately $2^{-32}$, i.e., one in four billion corruptions will be undetected by the patrol scrubber. However, it will be detected by the next read by the CPU.

Error Accumulation Prevention

In another aspect, subject matter described herein addresses issues involved with error accumulation prevention in memory systems. A traditional patrol scrubber iterates over the total physical memory space, reads from each address and writes the data back. If an error is detected, it is corrected by ECC. In examples described herein, a patrol scrubber is modified to adjust to detection-only capability as shown in FIG. 8 In brief, once the patrol scrubber detects an error, the erroneous cacheline is stored in an error buffer table in memory in order to prevent error accumulation. In subsequent iterations, the patrol scrubber skips over the addresses that are present in the error buffer table. The error buffer table holds the data until the CPU accesses the address through a read or write or an explicit trigger back to the CPU to force a read. The error-correcting engine will have the domain-specific tweak to fully recover the parity and perform correction.

Figure 4:
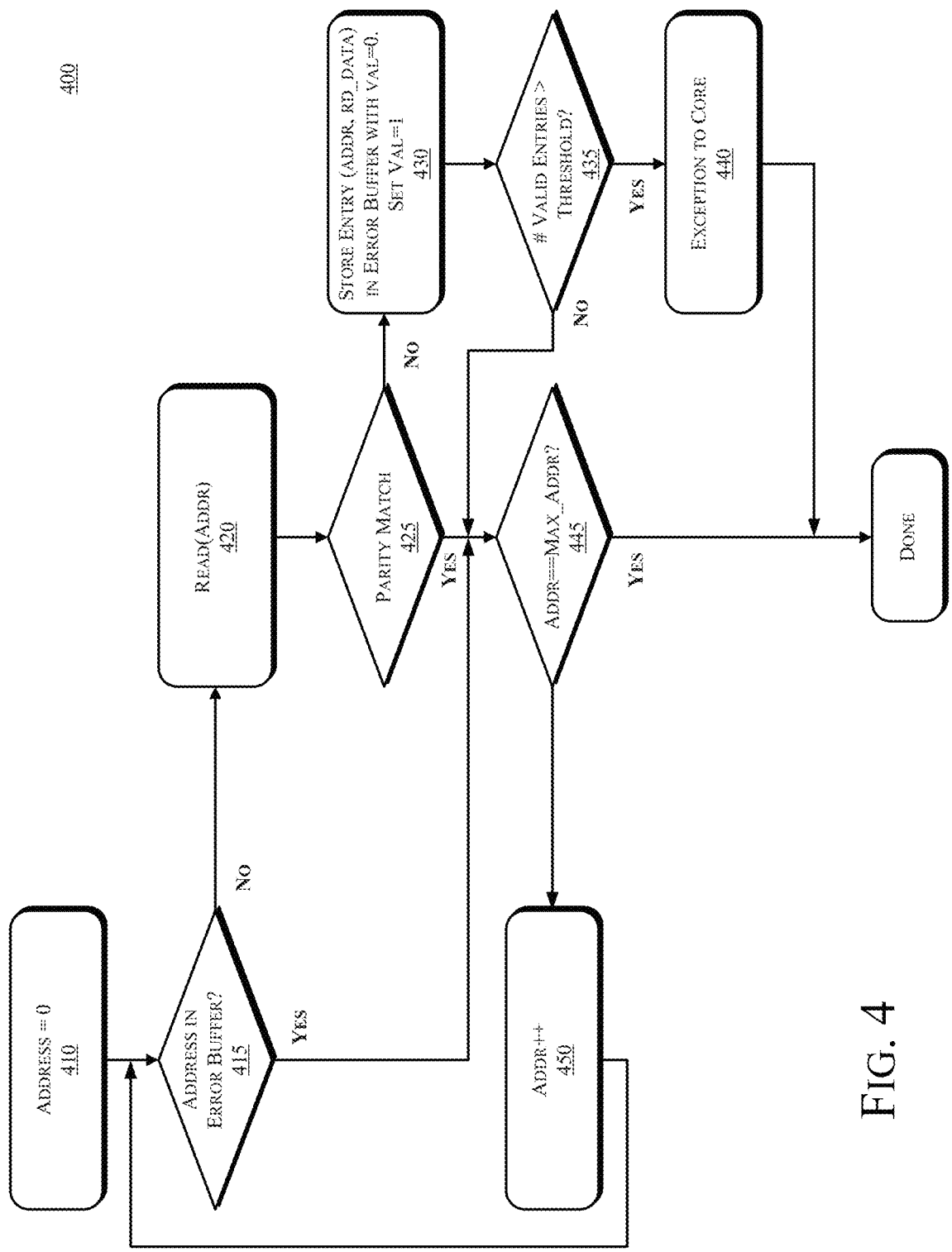
FIG. 4 is a flowchart illustrating operations in a method to implement memory operations in accordance with some embodiments.

FIG. 4 illustrates flows implemented in patrol scrubber operations. In greater detail, referring to FIG. 4, at operation 410 the patrol scrubber sets the memory address to zero (0). If, at operation 415, the current address is not in the error buffer table then control passes to operation 420 and the data in the current address is read. If, at operation 425 there is not a parity match (indicating that there is an error in the data at the address) then control passes to operation 430 and the entry at the current address (data plus address) is stored in the error buffer with VAL=0. VAL is then set to 1. VAL is a counter that increments for every entry stored in the error buffer.

If, at operation 435 the number of valid entries is not greater than a threshold value then control passes to operation 445 and processing continues. By contrast, if at operation 435 the number of valid entries is greater than a threshold then control passes to operation 440 and an exception is generated and passed to the core. In some examples the error buffer may be implemented in hardware as an SRAM table, hence the threshold size is fixed. The larger the error buffer, the longer the system can run without clearing the buffer. In some examples the error buffer may utilize 1 KB of memory. In some examples a threshold can be used to trigger an event (alert/exception) back to the host (CPU) to request cleanup for these entries by issuing a read. In other examples an alter may be triggered by every error found by the patrol scrubber.

If, at operation 415 the current address is in the error buffer table, or if, at operation there is a parity match, then control passes to operation 445. If, at operation 445, the current address is the maximum address of the address space then the current sweep of the patrol scrubber is finished. By contrast, if at operation 445 the current address is not the maximum address then control passes to operation 450 and the address is increment, whereupon control passes back to operation 415. This allows the patrol scrubber to go through every address to read the data. If any errors are detected, they are logged in the error log and VAL is incremented as an error count.

Figure 5:
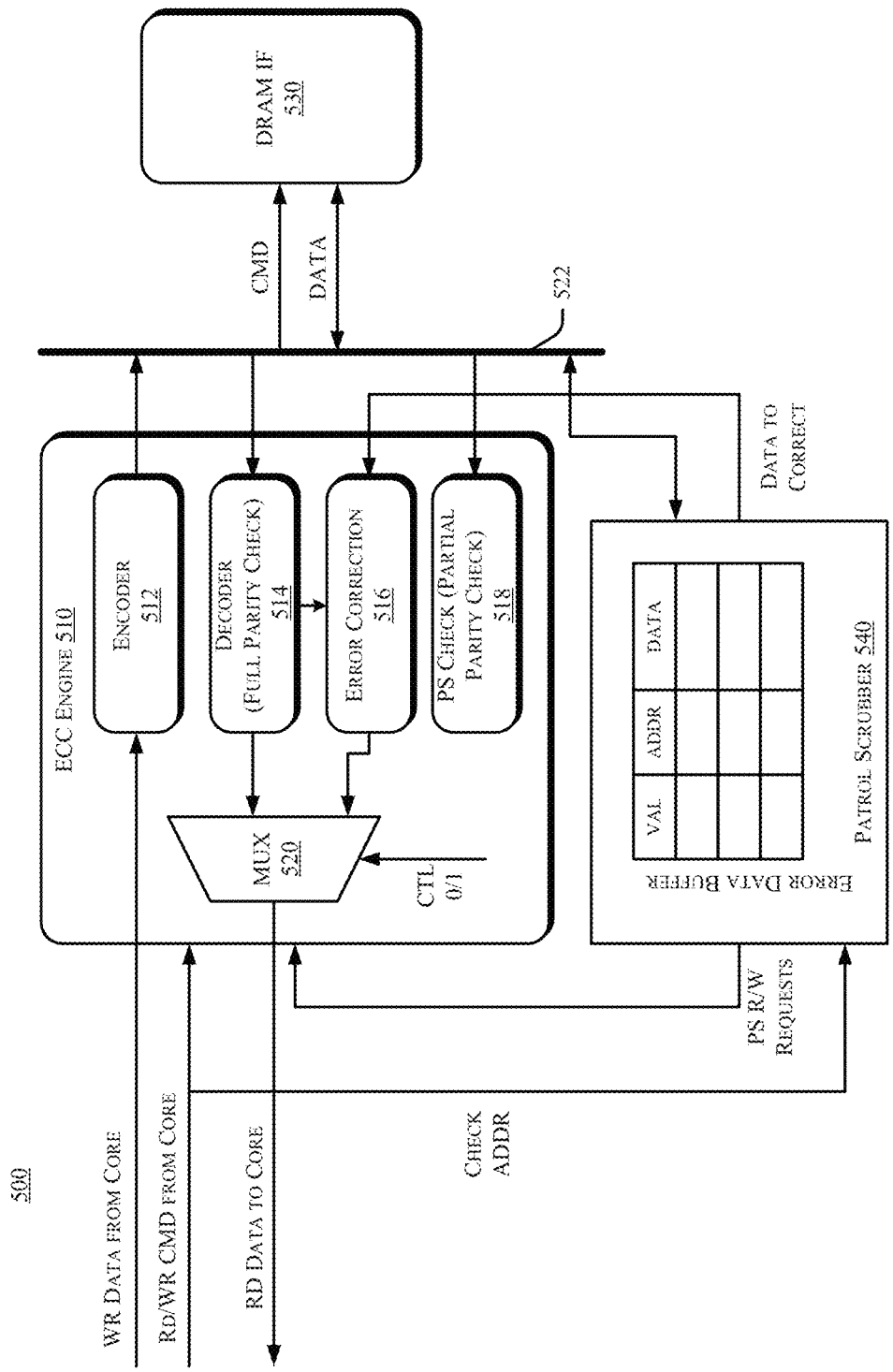
FIG. 5 is a schematic illustration of an ECC subsystem in accordance with some embodiments.

FIG. 5 is a schematic illustration of an ECC subsystem 500 in accordance with some embodiments. Referring to FIG. 5, in some examples an ECC engine 510 comprises an encoder 512, a decoder 514 which implements a full parity check, an error correction module 516, and a PS check module which implements a partial parity check. The outputs of the DRAM interface 530 and the error correction 516 are input to a multiplexer 520. The control signal for the multiplexor 520 is "error_detected". If 0 (i.e., no error), direct path is taken. If 1 (i.e., error), the output from error-correction logic is send back to core. The encoder 512, decoder 514, and PS check 518 are communicatively coupled to a DRAM interface 530 via a communication bus 522.

A patrol scrubber 540 maintains an error data buffer, as described above in reference to FIG. 4. In some examples the error buffer is monitors the addresses requested by the CPU. If the read address matches one of the entries in the error buffer, instead of performing a read from DRAM, the data is read from the error log entry and returned to the ECC engine for correction. On a write from CPU, an entry with the matching address is simply invalidated, as the data from the CPU will overwrite erroneous data in DRAM. This is described in the FIG. 6.

Figure 6:
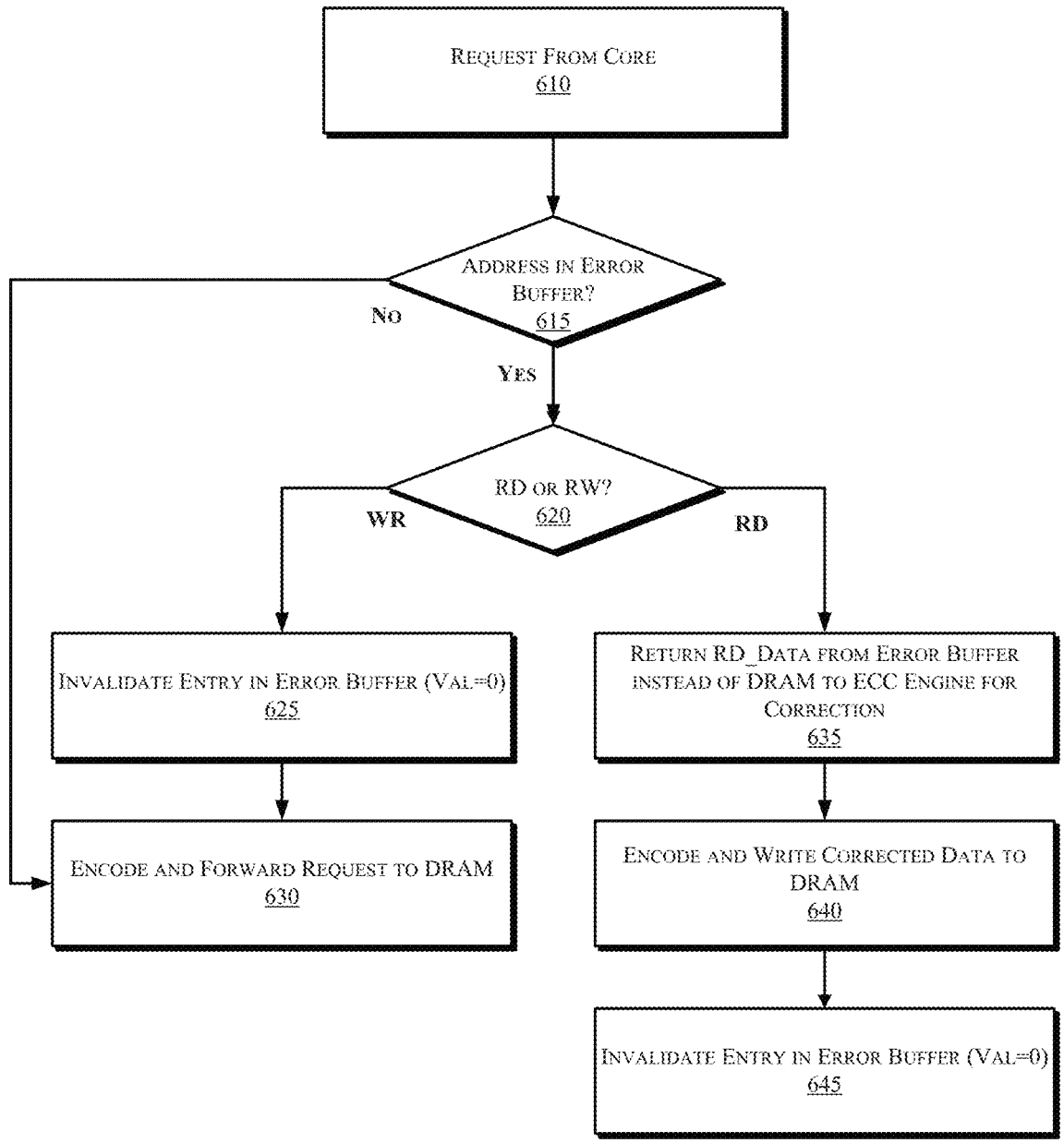
FIG. 6 is a flowchart illustrating operations in a method to implement memory operations in accordance with some embodiments.

FIG. 6 is a flowchart illustrating operations in a method to implement memory operations in accordance with some embodiments. At operation 610 a request (e.g., a read/write request) is received from the core. If, at operation 615 the memory address associated with the request is not in the error buffer, then control passes to operation 630 and the request is encoded and forwarded to DRAM memory. By contrast, if at operation 615 the address associated with the request is in the error buffer, then control passes to operation 620.

If, at operation 620, the request is a write operation then control passes to operation 625 and the entry in the error buffer is invalidated (i.e., the valid bit/flag VAL is set to 0). Control then passes to operation 630 and the request is encoded and forwarded to DRAM memory. By contrast, if at operation 620 the request is a read operation then control passes to operation 635 and the data associated with the read operation is returned from the error buffer instead of the DRAM to the ECC engine 510 for correction. At operation 640 the corrected data is encoded and written to DRAM, and at operation 645 the entry in the error buffer is invalidated (i.e., the valid bit/flag is set to 0).

Figure 7:
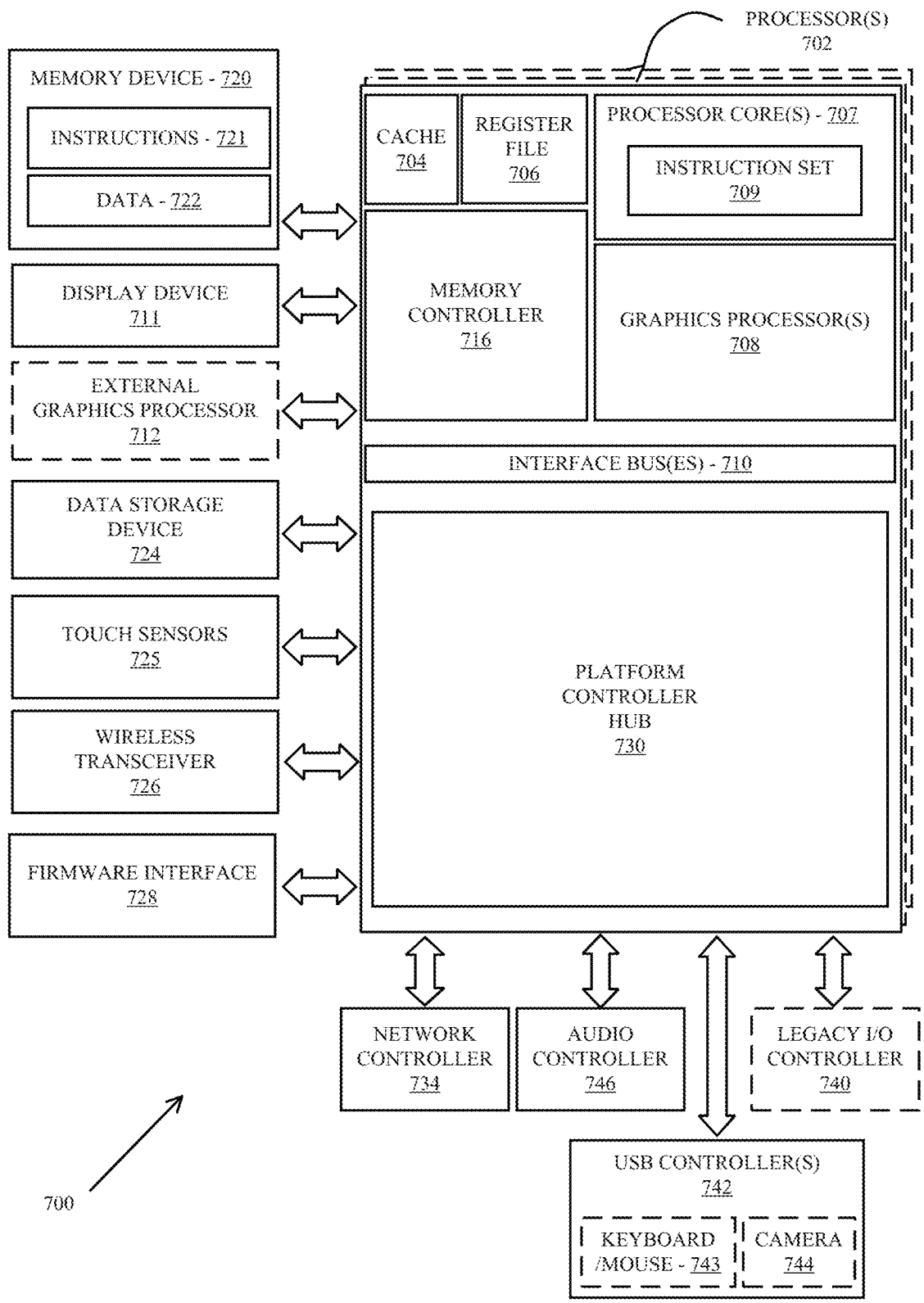
FIG. 7 is a schematic illustration of a computing architecture which may be adapted to implement key rotation in accordance with some embodiments.

FIG. 7 illustrates an embodiment of an exemplary computing architecture that may be suitable for implementing various embodiments as previously described. In various embodiments, the computing architecture 700 may comprise or be implemented as part of an electronic device. In some embodiments, the computing architecture 700 may be representative, for example of a computer system that implements one or more components of the operating environments described above. In some embodiments, computing architecture 700 may be representative of one or more portions or components of a DNN training system that implement one or more techniques described herein. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 includes one or more processors 702 and one or more graphics processors 708, and may be a single processor desktop system, a multiprocessor workstation system, or a server system having a large number of processors 702 or processor cores 707. In on embodiment, the system 700 is a processing platform incorporated within a system-on-a-chip (SoC or SOC) integrated circuit for use in mobile, handheld, or embedded devices.

An embodiment of system 700 can include, or be incorporated within, a server-based gaming platform, a game console, including a game and media console, a mobile gaming console, a handheld game console, or an online game console. In some embodiments system 700 is a mobile phone, smart phone, tablet computing device or mobile Internet device. Data processing system 700 can also include, couple with, or be integrated within a wearable device, such as a smart watch wearable device, smart eyewear device, augmented reality device, or virtual reality device. In some embodiments, data processing system 700 is a television or set top box device having one or more processors 702 and a graphical interface generated by one or more graphics processors 708.

In some embodiments, the one or more processors 702 each include one or more processor cores 707 to process instructions which, when executed, perform operations for system and user software. In some embodiments, each of the one or more processor cores 707 is configured to process a specific instruction set 709. In some embodiments, instruction set 709 may facilitate Complex Instruction Set Computing (CISC), Reduced Instruction Set Computing (RISC), or computing via a Very Long Instruction Word (VLIW). Multiple processor cores 707 may each process a different instruction set 709, which may include instructions to facilitate the emulation of other instruction sets. Processor core 707 may also include other processing devices, such a Digital Signal Processor (DSP).

In some embodiments, the processor 702 includes cache memory 704. Depending on the architecture, the processor 702 can have a single internal cache or multiple levels of internal cache. In some embodiments, the cache memory is shared among various components of the processor 702. In some embodiments, the processor 702 also uses an external cache (e.g., a Level-3 (L3) cache or Last Level Cache (LLC)) (not shown), which may be shared among processor cores 707 using known cache coherency techniques. A register file 706 is additionally included in processor 702 which may include different types of registers for storing different types of data (e.g., integer registers, floating point registers, status registers, and an instruction pointer register). Some registers may be general-purpose registers, while other registers may be specific to the design of the processor 702.

In some embodiments, one or more processor(s) 702 are coupled with one or more interface bus(es) 710 to transmit communication signals such as address, data, or control signals between processor 702 and other components in the system. The interface bus 710, in one embodiment, can be a processor bus, such as a version of the Direct Media Interface (DMI) bus. However, processor busses are not limited to the DMI bus, and may include one or more Peripheral Component Interconnect buses (e.g., PCI, PCI Express), memory busses, or other types of interface busses. In one embodiment the processor(s) 702 include an integrated memory controller 716 and a platform controller hub 730. The memory controller 716 facilitates communication between a memory device and other components of the system 700, while the platform controller hub (PCH) 730 provides connections to I/O devices via a local I/O bus.

Memory device 720 can be a dynamic random-access memory (DRAM) device, a static random-access memory (SRAM) device, flash memory device, phase-change memory device, or some other memory device having suitable performance to serve as process memory. In one embodiment the memory device 720 can operate as system memory for the system 700, to store data 722 and instructions 721 for use when the one or more processors 702 executes an application or process. Memory controller hub 716 also couples with an optional external graphics processor 712, which may communicate with the one or more graphics processors 708 in processors 702 to perform graphics and media operations. In some embodiments a display device 711 can connect to the processor(s) 702. The display device 711 can be one or more of an internal display device, as in a mobile electronic device or a laptop device or an external display device attached via a display interface (e.g., DisplayPort, etc.). In one embodiment the display device 711 can be a head mounted display (HMD) such as a stereoscopic display device for use in virtual reality (VR) applications or augmented reality (AR) applications.

In some embodiments the platform controller hub 730 enables peripherals to connect to memory device 720 and processor 702 via a high-speed I/O bus. The I/O peripherals include, but are not limited to, an audio controller 746, a network controller 734, a firmware interface 728, a wireless transceiver 726, touch sensors 725, a data storage device 724 (e.g., hard disk drive, flash memory, etc.). The data storage device 724 can connect via a storage interface (e.g., SATA) or via a peripheral bus, such as a Peripheral Component Interconnect bus (e.g., PCI, PCI Express). The touch sensors 725 can include touch screen sensors, pressure sensors, or fingerprint sensors. The wireless transceiver 726 can be a Wi-Fi transceiver, a Bluetooth transceiver, or a mobile network transceiver such as a 3G, 4G, or Long Term Evolution (LTE) transceiver. The firmware interface 728 enables communication with system firmware, and can be, for example, a unified extensible firmware interface (UEFI). The network controller 734 can enable a network connection to a wired network. In some embodiments, a high-performance network controller (not shown) couples with the interface bus 710. The audio controller 746, in one embodiment, is a multi-channel high definition audio controller. In one embodiment the system 700 includes an optional legacy I/O controller 740 for coupling legacy (e.g., Personal System 2 (PS/2)) devices to the system. The platform controller hub 730 can also connect to one or more Universal Serial Bus (USB) controllers 742 connect input devices, such as keyboard and mouse 743 combinations, a camera 744, or other USB input devices.

The following pertains to further examples.

Example 1 is an apparatus, comprising a controller comprising circuitry, the controller to generate an error correction code for a memory line, the memory line comprising a first plurality of data blocks, wherein the error correction code comprises a first plurality of parity bits and a second plurality of parity bits; apply a domain-specific function to the second plurality of parity bits to generate a modified block of parity bits; generate a metadata block corresponding to the memory line, wherein the metadata block comprises the error correction code for the memory line and at least a portion of the modified block of parity bits; encode the first plurality of data blocks and the metadata block to generate a first encoded data set; and provide the encoded data set and the encoded metadata block for storage on a memory module.

In Example 2, the subject matter of Example 1, can optionally include an arrangement wherein the memory module comprises a plurality of memory devices and wherein the encoded metadata block and the first encoded data set are each stored on a separate memory device of the plurality of memory devices.

In Example 3, the subject matter of any one of Examples 1-2 can optionally include a processor to encrypt a physical address of a memory location with a domain key to generate a domain-specific product; and truncate the domain-specific product to a desired length.

In Example 4, the subject matter of any one of Examples 1-3 can optionally include a processor to apply the domain-specific function to the first plurality of data blocks.

In Example 5, the subject matter of any one of Examples 1-4 can optionally include a processor to obtain a second encoded data set and a corresponding second encoded metadata block from the memory module; decode the second encoded set and the corresponding encoded metadata block to generate a second modified block of parity bits; apply the domain-specific function to the second modified block of parity bits to generate a recovered second block of parity bits; combine the recovered second block of parity bits with a recovered first block of parity bits to generate a recovered error correction code; and determine whether at least one error is present in the second encoded data set or corresponding second encoded metadata block based on a comparison between the error correction code and the recovered error correction code.

In Example 6, the subject matter of any one of Examples 1-5 can optionally include a processor to maintain an error data buffer table in a memory, the error data buffer table to store address information and data from the memory module that has been identified as having at least one error.

In Example 7, the subject matter of any one of Examples 1-6 can optionally include a processor to receive, from a requestor, a read request directed to access a cache memory address stored in the error data buffer table; and forward the data associated with the cache memory address in the error data buffer table to an error code correction engine for correction.

Example 8 is a computer-implemented method, comprising generating an error correction code for a memory line, the memory line comprising a first plurality of data blocks, wherein the error correction code comprises a first plurality of parity bits and a second plurality of parity bits; applying a domain-specific function to the second plurality of parity bits to generate a modified block of parity bits; generate a metadata block corresponding to the memory line, wherein the metadata block comprises the error correction code for the memory line and at least a portion of the modified block of parity bits; encoding the first plurality of data blocks and the metadata block to generate a first encoded data set; and providing the encoded data set and the encoded metadata block for storage on a memory module.

In Example 9, the subject matter of Example 8 can optionally include an arrangement wherein the memory module comprises a plurality of memory devices and wherein the encoded metadata block and the first encoded data set are each stored on a separate memory device of the plurality of memory devices.

In Example 10, the subject matter of any one of Examples 8-9 can optionally include encrypting a physical address of a memory location with a domain key to generate a domain-specific product; and truncating the domain-specific product to a desired length.

In Example 11, the subject matter of any one of Examples 8-10 can optionally include applying the domain-specific function to the first plurality of data blocks.

In Example 12, the subject matter of any one of Examples 8-11 can optionally include obtaining a second encoded data set and a corresponding second encoded metadata block from the memory module; decoding the second encoded set and the corresponding encoded metadata block to generate a second modified block of parity bits; apply the domain-specific function to the second modified block of parity bits to generate a recovered second block of parity bits; combining the recovered second block of parity bits with a recovered first block of parity bits to generate a recovered error correction code; and determining whether at least one error is present in the second encoded data set or corresponding second encoded metadata block based on a comparison between the error correction code and the recovered error correction code.

In Example 13, the subject matter of any one of Examples 8-12 can optionally include maintaining an error data buffer table in a memory, the error data buffer table to store address information and data from the memory module that has been identified as having at least one error.

In Example 14, the subject matter of any one of Examples 8-13 can optionally include receiving, from a requestor, a read request directed to access a cache memory address stored in the error data buffer table; and forwarding the data associated with the cache memory address in the error data buffer table to an error code correction engine for correction.

Example 15 is a non-transitory computer-readable medium comprising instructions which, when executed by a processor, configure the processor to generate an error correction code for a memory line, the memory line comprising a first plurality of data blocks, wherein the error correction code comprises a first plurality of parity bits and a second plurality of parity bits; apply a domain-specific function to the second plurality of parity bits to generate a modified block of parity bits; generate a metadata block corresponding to the memory line, wherein the metadata block comprises the error correction code for the memory line and at least a portion of the modified block of parity bits; encode the first plurality of data blocks and the metadata block to generate a first encoded data set; and provide the encoded data set and the encoded metadata block for storage on a memory module.

In Example 16, the subject matter of Example 15 can optionally include an arrangement wherein the memory module comprises a plurality of memory devices and wherein the encoded metadata block and the first encoded data set are each stored on a separate memory device of the plurality of memory devices.

In Example 17, the subject matter of any one of Examples 15-16 can optionally include instructions to encrypt a physical address of a memory location with a domain key to generate a domain-specific product; and truncate the domain-specific product to a desired length.

In Example 18, the subject matter of any one of Examples 15-17 can optionally include instructions to apply the domain-specific function to the first plurality of data blocks.

In Example 9 the subject matter of any one of Examples 15-18 can optionally include instructions to obtain a second encoded data set and a corresponding second encoded metadata block from the memory module; decode the second encoded set and the corresponding encoded metadata block to generate a second modified block of parity bits; apply the domain-specific function to the second modified block of parity bits to generate a recovered second block of parity bits; combine the recovered second block of parity bits with a recovered first block of parity bits to generate a recovered error correction code; and determine whether at least one error is present in the second encoded data set or corresponding second encoded metadata block based on a comparison between the error correction code and the recovered error correction code.

In Example 20, the subject matter of any one of Examples 15-19 can optionally include instructions to maintain an error data buffer table in a memory, the error data buffer table to store address information and data from the memory module that has been identified as having at least one error.

In Example 21, the subject matter of any one of Examples 15-20 can optionally include instructions to receive, from a requestor, a read request directed to access a cache memory address stored in the error data buffer table; and forward the data associated with the cache memory address in the error data buffer table to an error code correction engine for correction.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and examples are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and examples are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and examples are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular examples, connected may be used to indicate that two or more elements are in direct physical or electrical contact with each other. Coupled may mean that two or more elements are in direct physical or electrical contact. However, coupled may also mean that two or more elements may not be in direct contact with each other, yet may still cooperate or interact with each other.

Reference in the specification to "one example" or "some examples" means that a particular feature, structure, or characteristic described in connection with the example is included in at least an implementation. The appearances of the phrase "in one example" in various places in the specification may or may not be all referring to the same example.

Although examples have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus, comprising:
a controller comprising circuitry, the controller to:
generate an error correction code for a memory line, the memory line comprising a first plurality of data blocks, wherein the error correction code comprises a first plurality of parity bits and a second plurality of parity bits;
apply a domain-specific function to the second plurality of parity bits to generate a modified block of parity bits;
generate a metadata block corresponding to the memory line, wherein the metadata block comprises the error correction code for the memory line and at least a portion of the modified block of parity bits;
encode the first plurality of data blocks to generate a first encoded data set;
encode the metadata block to generate a first encoded metadata block; and
store the first encoded data set and the first encoded metadata block on a memory module.

2. The apparatus of claim 1, wherein the memory module comprises a plurality of memory devices and wherein the first encoded metadata block and the first encoded data set are each stored on a separate memory device of the plurality of memory devices.

3. The apparatus of claim 1, the controller to:
encrypt a physical address of a memory location with a domain key to generate a domain specific product; and
truncate the domain-specific product to a desired length.

4. The apparatus of claim 1, the controller to:
apply the domain-specific function to the first plurality of data blocks.

5. The apparatus of claim 4, the controller to:
maintain an error data buffer table in a memory, the error data buffer table to store address information and data from the memory module that has been identified as having at least one error.

6. The apparatus of claim 5, the controller to:
receive, from a requestor, a read request directed to access a cache memory address stored in the error data buffer table; and
forward the data associated with the cache memory address in the error data buffer table to an error code correction engine for correction.

7. The apparatus of claim 1, the controller to:
obtain a second encoded data set and a corresponding second encoded metadata block from the memory module;
decode the second encoded set and the corresponding second encoded metadata block to generate a second modified block of parity bits;
apply the domain-specific function to the second modified block of parity bits to generate a recovered second block of parity bits;
combine the recovered second block of parity bits with a recovered first block of parity bits to generate a recovered error correction code; and
determine whether at least one error is present in the second encoded data set or corresponding second encoded metadata block based on a comparison between the error correction code and the recovered error correction code.

8. A computer-implemented method, comprising:
generating an error correction code for a memory line, the memory line comprising a first plurality of data blocks, wherein the error correction code comprises a first plurality of parity bits and a second plurality of parity bits;
applying a domain-specific function to the second plurality of parity bits to generate a modified block of parity bits;
generating a metadata block corresponding to the memory line, wherein the metadata block comprises the error correction code for the memory line and at least a portion of the modified block of parity bits;
encoding the first plurality of data blocks to generate a first encoded data set;
encoding the metadata block to generate a first encoded metadata block; and
store the first encoded data set and the first encoded metadata block on a memory module.

9. The computer-implemented method of claim 8, wherein the memory module comprises a plurality of memory devices and wherein the first encoded metadata block and the first encoded data set are each stored on a separate memory device of the plurality of memory devices.

10. The computer-implemented method of claim 8, further comprising:
encrypting a physical address of a memory location with a domain key to generate a domain-specific product; and
truncating the domain-specific product to a desired length.

11. The computer-implemented method of claim 10, further comprising:
applying the domain-specific function to the first plurality of data blocks.

12. The computer-implemented method of claim 11, further comprising:
obtaining a second encoded data set and a corresponding second encoded metadata block from the memory module;
decoding the second encoded set and the corresponding second encoded metadata block to generate a second modified block of parity bits;

applying the domain-specific function to the second modified block of parity bits to generate a recovered second block of parity bits;

combining the recovered second block of parity bits with a recovered first block of parity bits to generate a recovered error correction code; and determining whether at least one error is present in the second encoded data set or corresponding second encoded metadata block based on a comparison between the error correction code and the recovered error correction code.

13. The computer-implemented method of claim 11, further comprising:

maintaining an error data buffer table in a memory, the error data buffer table to store address information and data from the memory module that has been identified as having at least one error.

14. The computer-implemented method of claim 13, further comprising:

receiving, from a requestor, a read request directed to access a cache memory address stored in the error data buffer table; and forwarding the data associated with the cache memory address in the error data buffer table to an error code correction engine for correction.

15. A non-transitory computer-readable medium comprising instructions which, when executed by a processor, configure the processor to:

generate an error correction code for a memory line, the memory line comprising a first plurality of data blocks, wherein the error correction code comprises a first plurality of parity bits and a second plurality of parity bits;

apply a domain-specific function to the second plurality of parity bits to generate a modified block of parity bits;

generate a metadata block corresponding to the memory line, wherein the metadata block comprises the error correction code for the memory line and at least a portion of the modified block of parity bits;

encode the first plurality of data blocks to generate a first encoded data set;

encode the metadata block to generate a first encoded metadata block; and store the first encoded data set and the first encoded metadata block on a memory module.

16. The non-transitory computer-readable medium of claim 15, wherein the memory module comprises a plurality of memory devices and wherein the first encoded metadata block and the first encoded data set are each stored on a separate memory device of the plurality of memory devices.

17. The non-transitory computer-readable medium of claim 15, wherein:

encrypt a physical address of a memory location with a domain key to generate a domain specific product; and truncate the domain-specific product to a desired length.

18. The non-transitory computer-readable medium of claim 17, further comprising instructions which, when executed by the processor, configure the processor to:

apply the domain-specific function to the first plurality of data blocks.

19. The non-transitory computer-readable medium of claim 18, further comprising instructions which, when executed by the processor, configure the processor to:

obtain a second encoded data set and a corresponding second encoded metadata block from the memory module;

decode the second encoded set and the corresponding second encoded metadata block to generate a second modified block of parity bits;

apply the domain-specific function to the second modified block of parity bits to generate a recovered second block of parity bits;

combine the recovered second block of parity bits with a recovered first block of parity bits to generate a recovered error correction code; and determine whether at least one error is present in the second encoded data set or corresponding second encoded metadata block based on a comparison between the error correction code and the recovered error correction code.

20. The non-transitory computer-readable medium of claim 19, further comprising instructions which, when executed by the processor, configure the processor to:

maintain an error data buffer table in a memory, the error data buffer table to store address information and data from the memory module that has been identified as having at least one error.

21. The non-transitory computer-readable medium of claim 20, further comprising instructions which, when executed by the processor, configure the processor to:

receive, from a requestor, a read request directed to access a cache memory address stored in the error data buffer table; and forward the data associated with the cache memory address in the error data buffer table to an error code correction engine for correction.

* * * * *